(12) United States Patent
Vidovic et al.

(10) Patent No.: US 10,510,330 B2
(45) Date of Patent: Dec. 17, 2019

(54) DEVICE AND METHOD FOR SOUND DEADENING A COMPONENT

(71) Applicant: SIKA TECHNOLOGY AG, Baar (CH)

(72) Inventors: Rudolf Vidovic, Frankenthal (DE);
Christian Hardt, Kelsterbach (DE);
Bernd Lieutenant, Baldringen (DE);
Joachim Oster, Niederhausen (DE);
Torsten Graf, Gundheim (DE); Jean Georges Becker, Worms (DE)

(73) Assignee: SIKA TECHNOLOGY AG, Baar (CH)

( * ) Notice: Subject to any disclaimer, the term of this patent is extended or adjusted under 35 U.S.C. 154(b) by 187 days.

(21) Appl. No.: 15/316,573

(22) PCT Filed: Jun. 8, 2015

(86) PCT No.: PCT/EP2015/062728
§ 371 (c)(1),
(2) Date: Apr. 19, 2017

(87) PCT Pub. No.: WO2015/185757
PCT Pub. Date: Dec. 10, 2015

(65) Prior Publication Data
US 2017/0221467 A1    Aug. 3, 2017

(30) Foreign Application Priority Data

Jun. 6, 2014    (DE) .................. 10 2014 210 910

(51) Int. Cl.
*G10K 11/168*    (2006.01)
*B32B 5/18*    (2006.01)
(Continued)

(52) U.S. Cl.
CPC .............. *G10K 11/168* (2013.01); *B32B 5/18* (2013.01); *B32B 7/12* (2013.01); *B32B 11/048* (2013.01);
(Continued)

(58) Field of Classification Search
CPC .... G10K 11/168; G10K 11/162; G10K 11/16; B32B 5/18; B32B 5/20; B32B 11/048;
(Continued)

(56) References Cited

U.S. PATENT DOCUMENTS 4,346,782 A * 8/1982 Bohm ...................... B05D 7/54
181/207
4,798,756 A * 1/1989 Fukushima ............. B32B 27/12
428/198

(Continued)

FOREIGN PATENT DOCUMENTS

DE          19809207 C1    8/1999
DE    602004005113 T2    11/2007
(Continued)

OTHER PUBLICATIONS

International Preliminary Report on Patentability for corresponding application PCT/EP2015/062728 filed Jun. 8, 2015; dated Dec. 15, 2016.

(Continued)

*Primary Examiner* — Edgardo San Martin
(74) *Attorney, Agent, or Firm* — Oliff PLC

(57) ABSTRACT

A device for deadening the sound of a component having a damping layer of a foamed material and a stiffening layer, which is fixedly connected to the damping layer and which is stiffer than the damping layer, wherein the damping layer is formed by a foamed hot-melt adhesive.

7 Claims, 1 Drawing Sheet

(51) Int. Cl.
| | |
|---|---|
| *B32B 11/04* | (2006.01) |
| *B32B 15/04* | (2006.01) |
| *B32B 27/06* | (2006.01) |
| *B32B 29/00* | (2006.01) |
| *B32B 7/12* | (2006.01) |
| *B32B 27/20* | (2006.01) |
| *B32B 27/32* | (2006.01) |
| *B32B 27/34* | (2006.01) |
| *B32B 27/30* | (2006.01) |
| *B32B 37/12* | (2006.01) |
| *G10K 11/162* | (2006.01) |
| *B32B 38/00* | (2006.01) |

(52) U.S. Cl.
CPC .......... *B32B 15/046* (2013.01); *B32B 27/065* (2013.01); *B32B 27/20* (2013.01); *B32B 27/306* (2013.01); *B32B 27/32* (2013.01); *B32B 27/34* (2013.01); *B32B 29/007* (2013.01); *B32B 37/1207* (2013.01); *B32B 2037/1215* (2013.01); *B32B 2038/0084* (2013.01); *B32B 2250/02* (2013.01); *B32B 2262/101* (2013.01); *B32B 2266/025* (2013.01); *B32B 2266/0221* (2013.01); *B32B 2266/0228* (2013.01); *B32B 2266/0242* (2013.01); *B32B 2266/0257* (2013.01); *B32B 2266/0292* (2013.01); *B32B 2307/102* (2013.01); *B32B 2307/51* (2013.01); *B32B 2398/20* (2013.01); *B32B 2509/00* (2013.01); *B32B 2509/10* (2013.01); *B32B 2605/08* (2013.01)

(58) Field of Classification Search
CPC ................ B32B 15/046; B32B 27/065; B32B 2037/1215; B32B 37/1207
See application file for complete search history.

(56) References Cited

U.S. PATENT DOCUMENTS

| | | | |
|---|---|---|---|
| 5,151,327 A | 9/1992 | Nishiyama | |
| 5,153,388 A * | 10/1992 | Wittenmayer | B32B 5/18 181/290 |
| 6,110,985 A | 8/2000 | Wheeler | |
| 6,213,721 B1 * | 4/2001 | Watkinson | G10K 11/168 416/244 A |
| 8,158,246 B2 * | 4/2012 | Inoue | G10K 11/168 428/304.4 |
| 8,997,920 B2 * | 4/2015 | Fuhrmann | G10K 11/002 181/207 |
| 9,133,615 B2 * | 9/2015 | Bischoff | G10K 11/168 |
| 10,026,387 B2 * | 7/2018 | Becker | B32B 5/02 |
| 2004/0168853 A1 * | 9/2004 | Gunasekera | G10K 11/168 181/290 |
| 2005/0150720 A1 * | 7/2005 | Tudor | G10K 11/162 181/286 |
| 2009/0277716 A1 * | 11/2009 | Eadara | B32B 7/02 181/290 |

FOREIGN PATENT DOCUMENTS

| | | |
|---|---|---|
| DE | 102007000792 A1 | 4/2009 |
| DE | 102009006295 A1 | 9/2009 |
| WO | 2014053179 A1 | 4/2014 |
| WO | 2014083179 A1 | 6/2014 |

OTHER PUBLICATIONS

International Search Report for corresponding application PCT/EP2015/062728 filed Jun. 8, 2015; dated Sep. 14, 2015.

* cited by examiner

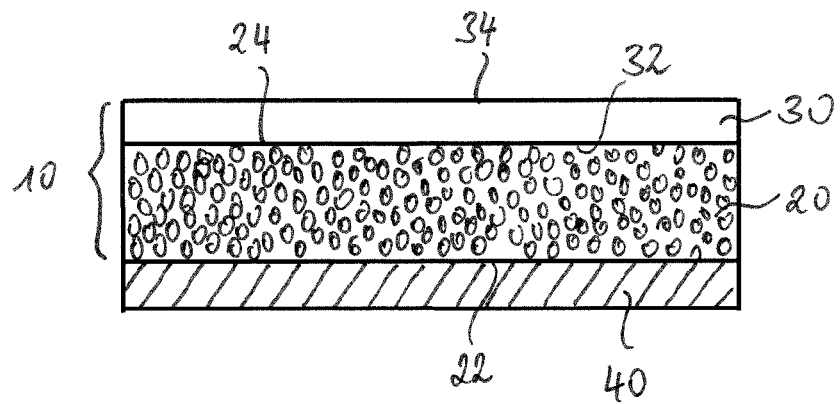
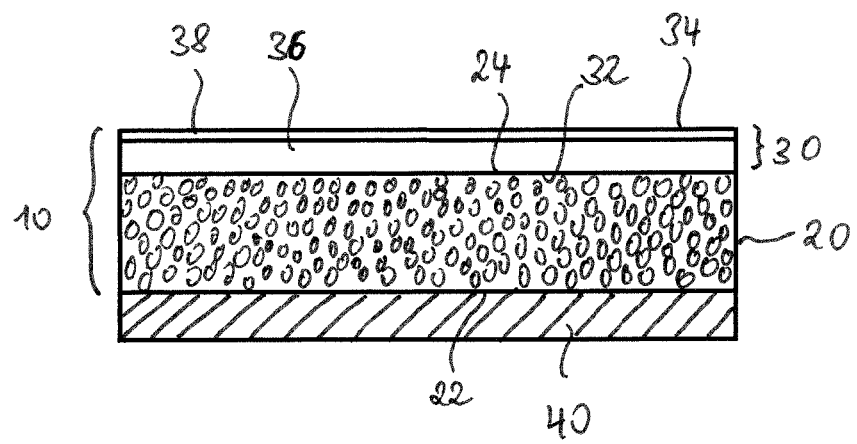

DEVICE AND METHOD FOR SOUND DEADENING A COMPONENT

TECHNICAL FIELD

The invention relates to a device as well as to a method for deadening the sound of a component, in particular of a component, which oscillates or which can oscillate.

BACKGROUND

Sound deadening coatings are known in a variety of embodiments for damping structure-borne sound of components, which can oscillate, in short sound deadening. The sound deadening coatings are fixedly connected to the component, the sound of which is to be deadened, and reduce the natural oscillations of the component by means of their properties. On the one hand, single-layered sound deadening coatings, in particular heavy foils of bitumen, are known. On the other hand, it is known that composite systems, which consist of an elastic damping layer and of a mostly relatively thin, stiff cover, reach a good sound deadening effect. The elastic damping layer can thereby be embodied as foam layer, in particular on the basis of bitumen. In addition to effective damping properties, a foam layer also offers a good thermal insulation, so that such a composite system can be used for acoustic purposes and for the thermal insulation of the component, so to speak. Fields of application of such composite systems are in particular metal plates of motor vehicles or housings of household appliances (white goods).

A fixed and holohedral connection, if possible, of the sound deadening coating and the component is required for an effective sound deadening of the component, in particular metal plate. Known sound deadening devices are connected to the component either mechanically, for example by means of clamping or screw elements, or by means of an adhesive layer (hot-melt adhesive), which is applied to the damping layer. The application of the adhesive to the foam layer, however, is technically complex and cost-intensive. The use of a hot sealable adhesive can furthermore be problematic, because it can thermally damage the foam layer. If a bitumen layer is used as damping layer, it is also possible in principle to apply the adhesive bitumen directly to the component, which is to be improved acoustically. However, such a connection does not fulfill the requirements on the low-temperature impact strength and does not ensure a permanent combination of the coating and the sheet plate substrate.

BRIEF SUMMARY

The disclosure concerns specifying a device and a method for deadening the sound of a component, which provide for a particularly effective and cost-efficient sound deadening.

The device according to the invention comprises a damping layer of a foamed material and a stiffening layer, which is fixedly connected to the damping layer and which is stiffer than the damping layer. The damping layer is thereby formed by means of a foamed hot-melt adhesive.

The method according to the invention for deadening the sound of a component comprises the steps:

attaching a device, which has a stiffening layer, and a damping layer of a foamed hot-melt adhesive, which is connected to the stiffening layer, to the component, the sound of which is to be deadened and establishing a fixed connection of the damping layer and the component by heating and subsequently cooling at least the damping layer of the device.

A basic idea of the invention can be seen in producing the damping layer, which is provided in particular for the sound absorption, or the foam layer of a foamed hot-melt adhesive in the case of a multi-layered composite system for damping structure-borne sound (sound deadening). The layer, which consists of a foamed hot-melt adhesive, thus combines the sound-damping properties of the damping device with the properties of an adhesive system in a single layer. Because of its porosity or the cavities embodied in the damping layer, respectively, the damping layer can furthermore also serve for the thermal insulation. The stiffening layer connected to the damping layer also contributes to the sound-damping properties, because, together with the damping layer, it forms a spring-mass system, which causes a particularly effective structure-borne sound damping. The denser and stiffer cover can furthermore also improve the sound damping. Due to the fact that an additional adhesive layer can be forgone, weight and costs can be reduced as compared to known composite systems with the same acoustic properties. The hot sealable foam layer ensures a permanent connection of the sound deadening coating with the component, the sound of which is to be deadened. The device, which dampens structure-borne sound, or the sound deadening coating, respectively, can also be identified as sound deadening coating or composite component, which dampens structure-borne sound.

A foam is in particular understood as a structure of pores, which are defined by webs and which form a cohesive structure. The pores or cavities are preferably filled with air and can be open pores or closed pores.

The stiffening layer has in particular a larger axial rigidity than the damping layer and can also be identified as axially rigid cover. The stiffening layer preferably has an E-module, which is larger than the E-module of the damping layer by at least the factor 5, preferably by at least the factor 10.

When being used on the component, the sound of which is to be deadened, the stiffening layer is arranged on the side of the damping layer, which faces away from the component, and in particular forms an exterior or outer layer of the device or of the composite component, respectively. The damping layer forms the opposite, second exterior or outer layer of the composite component and is provided for the direct connection to the component, the sound of which is to be deadened. The sound deadening device according to the invention is in particular a two-layered composite component, consisting of a damping layer, which is a foamed hot-melt adhesive layer, and a stiffening layer, which is connected thereto, in particular in a substance-to-substance bond. With the damping layer located between them, the stiffening layer and the metal plate, the sound of which is to be deadened, forms a "sandwich", which has a significantly reduced tendency to oscillate and which thus effects an efficient sound deadening. The device according to the invention can also be identified as sandwich or as sandwich coating.

Melt adhesives, also called hot-melt adhesives, are known to the skilled person in the art, in principle. These are adhesives, the viscosity of which decreases in response to heating and which form a substance-to-substance bond with the adjoining material in response to cooling. On principle, hot-melt adhesives are free from solvents and are solid at room temperature. It has been determined according to the invention that a foamed hot-melt adhesive as damping layer within a composite component leads to good structure-borne sound damping properties of the composite component, wherein an adhesive function can simultaneously be integrated into the damping layer. The foamed hot-melt adhesive or hot-melt adhesive, respectively, can be a polymer hot-melt, which includes in particular at least one thermoplastic polymer. The damping layer, which consists of a foamed hot-melt adhesive, can also be referred to as foamed hot-melt system or polymer system. The damping layer can comprise a hot sealable polymer foam.

To fasten the sound deadening device to the component, the sound of which is to be deadened, in particular metal plate, provision is in particular made for the pre-fabricated composite component to be heated at least area by area together with the component, the sound of which is to be deadened, if necessary. In particular, the damping layer is heated. Preferably, the damping layer bears on the component holohedrally in response to the heating, wherein an adaptation to the surface of the component can also take place due to the reduced viscosity. The heated damping layer adapts to uneven surfaces. Uneven features in the component can also be filled or compensated, respectively, for example, in this manner. The damping layer, if necessary together with the component, is cooled subsequently, whereby a fixed, in particular substance-to-substance bond of the damping layer and the component is established. The damping layer is preferably foamed prior to the heating for the purpose of adhesion to the component, the sound of which is to be deadened. In other words, the damping layer, which has already been foamed, is heated, so as to connect the latter to the component by means of a substance-to-substance bond. In particular the sound deadening device, which has the already foamed damping layer, is attached to the component and is connected thereto by heating. It is important to note that the term "connection" in the context of the invention at hand is in particular understood as adhesive connection.

The hot sealable damping layer can have a polymer foam or can consist thereof. To produce the foamed hot-melt adhesive layer, a polymer matrix can be foamed in a manner, which is known on principle to the person skilled in the art, in particular by means of a chemical and/or physical foaming agent or by blowing in gas. In particular, expandable hollow bodies can be used, which cause a foaming as a result of temperature increase. The foam body is subsequently calendared and the stiffening layer is mounted. The sound deadening device is preferably non-adhesive at room temperature and can thus be packaged and conveyed without complications. The hot-melt adhesive is activated only by means of temperature increase on location, preferably directly prior to application to the component or already on the component. The damping layer becomes adhesive thereby, in particular on its side, which faces away from the stiffening layer. To bring about the adhesive effect in particular on this side, it can be advantageous to effect the heating specifically on the side, which faces away from the stiffening layer, for example by means of heating the component, the sound of which is to be deadened, and a heat transfer from the component to the damping layer.

Particularly good acoustic, but also thermal properties can be reached in that the damping layer or the hot-melt adhesive layer, respectively, has a larger thickness than the stiffening layer. In a particularly preferred embodiment, the damping layer or foam layer, respectively, has a thickness of between 0.5 mm and 5 mm. The thickness is hereby in particular understood as the extension at right angles to the flat extension of the plate-shaped device or at right angles to the surface of the component, the sound of which is to be deadened, respectively. The stiffening layer preferably has a strength or thickness, respectively, in the range of between 0.05 mm and 0.3 mm. In particular in the case of non-metallic stiffening layers, however, larger layer thicknesses, in particular of up to 0.5 mm or of up to 1 mm, can be used as well.

Together, the damping layer and the stiffening layer preferably form the majority of the device according to the invention, in particular at least 90%, at least 95% or at least 98% of the thickness of the device or plate, the sound of which is to be deadened, respectively. Particularly preferably, the device consists of damping layer and stiffening layer.

The damping layer with its integrated hot-melt adhesive function is preferably intended for the direct or immediate connection to the component, the sound of which is to be deadened. The sound-deadening plate or foil can be applied to the component, the sound of which is to be deadened, in this way. Provision is furthermore preferably also not made between the damping layer and the stiffening layer for a further adhesive layer. The stiffening layer is thus arranged directly adjacent to the damping layer, so that these two layers of the composite component touch one another. Damping layer and stiffening layer are fixedly connected to one another, preferably by means of a substance-to-substance bond.

The foamed hot-melt adhesive, thus the damping layer, can be activated by means of a temperature increase, so that an adhesive surface for fastening the device to the component, the sound of which is to be deadened, is created. The foamed hot-melt adhesive layer can thus be connected to the component or can be fastened thereto, respectively, by heating and subsequent cooling. A substance-to-substance bond between the damping layer and the component is created by the cooling.

On principle, any foamed hot-melt adhesive can be used. A damping layer, which includes ethylene vinyl acetate (EVA) or which consists of ethylene vinyl acetate, is particularly preferred. In the alternative or in addition, the foamed damping layer can contain polyamide and/or butyl rubber and/or polyolefins, in particular thermo-plastic polyolefins (TPO) and/or styrene-butadiene block copolymers (SBS). The mentioned substances preferably form the majority of the damping layer, preferably at least 50% by weight, particularly preferably 70% by weight or 90% by weight.

The damping layer or foam layer, respectively, preferably has a density of between 0.1 kg/dm$^3$ and 1 kg/dm$^3$, in particular between 0.18 kg/dm$^3$ and 0.5 kg/dm$^3$.

The stiffening layer can have, for example, a metal foil and/or a plastic layer and/or cardboard and/or a bitumen layer, preferably comprising an outer cover layer. For weight reasons, in particular aluminum, but also steel, is possible as metal foil. The plastic layer can be, for example, as glass fiber reinforced plastic layer, in particular of polypropylene (PP) and/or polyamide (PA). In the case of a bitumen cover layer, provision is preferably made for a seal or sealing layer, for obtaining an adhesion-free surface. A well-formable coating, the sound of which is to be deadened, which is also suitable for components comprising surface structures, in particular depressions and protrusions, is obtained by means of the bitumen layer.

The invention also refers to a composite system or sandwich system, consisting of or having a component, the sound of which is to be deadened, in particular metal plate, and to a device according to the invention, which can be or which is fixedly connected to the component, the sound of which is to be deadened.

BRIEF DESCRIPTION OF THE DRAWINGS

The invention will be described in more detail below by means of exemplary embodiments, which are illustrated in the enclosed, schematic drawings.

FIG. 1 shows a first embodiment of a device according to the invention, and

FIG. 2 shows a second embodiment of a device according to the invention.

The same components or components, which act identically, are identified with the same reference numerals in all of the figures.

DETAILED DESCRIPTION

FIG. 1 shows a first embodiment of a sound-damping device 10 according to the invention, which can also have a sound-damping effect, in a schematic view in cross section. The device 10 is provided for a fixed, in particular substance-to-substance bond with a component 40, in particular a metal plate, and can also be identified as damping foil, damping plate or damping coating. The device 10 is a composite component and comprises a porous first layer, which is provided with cavities and which is identified as damping layer 20. The damping layer 20 can furthermore also serve as thermally insulating layer. The damping layer 20 consists of a foamed hot-melt adhesive and is equipped to be fixedly connected to the component 40, which is to be improved acoustically or the sound of which is to be deadened, respectively, in particular by means of a substance-to-substance bond. A first outer side 22 of the damping layer 20 is hereby connected to the component 40 in an adhesive manner, in particular by means of a substance-to-substance bond.

A stiffening layer 30, which is directly connected to the damping layer 20, is arranged on the second side 24 of the damping layer 20 located opposite the component 40. The stiffening layer 30 forms an axially rigid cover of the sandwich plate or of the device 10, respectively, and comprises a first side 32, which is connected to the foamed hot-melt adhesive layer, and a second, outer side 34. The stiffening layer 30 can be a metal layer or an in particular glass fiber reinforced plastic layer, for example. The stiffening layer 30 has a larger surface weight and a smaller thickness than the damping layer 20. The damping layer 20 is elastic, so that it can accommodate vibrations of the component and can convert them into heat, so as to effect a sound deadening of the component 40, wherein the sound deadening effect is further intensified by means of the stiffening layer 30, which is connected to the damping layer 20. As a whole, the component according to the invention is thus a composite component, which has a damping layer 20 and an exterior, stiff cover or stiffening layer 30.

The device 10 illustrated in FIG. 2 substantially corresponds to the device 10 according to FIG. 1. In contrast thereto, provision is made for a bitumen layer 36 as stiffening layer 30, which is covered with a sealing or cover layer 38. A beadable device for deadening sound for uneven (deformed) grounds is provided in this way, e.g. for white goods or the automobile sector. The bitumen layer 36 can be a bitumen heavy foil.

Due to the fact that the damping layer 20 is embodied as foamed hot-melt adhesive layer, the latter can be connected or adhered, respectively, to the stiffening layer 30 as well as to the component 40 without additional adhesive layers. An excellent acoustic efficiency is reached simultaneously by means of the elasticity and the formed cavities thereof.

The invention claimed is:

1. A device for deadening the sound of a component, comprising:
    a damping layer of a foamed material and
    a stiffening layer, which is fixedly connected to the damping layer and
    which is stiffer than the damping layer,
    wherein the damping layer is formed by means of a foamed hot-melt adhesive,
    wherein the damping layer is intended for the direct connection to the component, the sound of which is to be deadened, wherein the foamed hot-melt adhesive can be activated by means of a temperature increase, so that an adhesive surface for fastening the device to the component, the sound of which is to be deadened, is created,
    wherein the damping layer includes at least 50% by weight of ethylene vinyl acetate (EVA); and
    wherein, together, the damping layer and the stiffening layer form at least 90% of the thickness of the device.

2. The device according to claim 1, wherein the damping layer has a larger thickness than the stiffening layer.

3. The device according to claim 1, wherein the stiffening layer has a metal foil and/or a plastic layer and/or cardboard and/or a bitumen layer, comprising an outer cover layer.

4. A composite system having
    a component, the sound of which is to be deadened and
    a device according to claim 1, which is fixedly connected to the component, the sound of which is to be deadened.

5. A method for deadening the sound of a component comprising the steps:
    attaching a device, which has a stiffening layer, and a damping layer of a foamed hot-melt adhesive, which is fixedly connected to the stiffening layer, to the component, the sound of which is to be deadened, wherein the stiffening layer is stiffer than the damping layer, and
    establishing a fixed connection of the damping layer and the component by heating and subsequently cooling at least the damping layer of the device, wherein the damping layer includes at least 50% by weight of ethylene vinyl acetate (EVA);
    wherein, together, the damping layer and the stiffening layer form at least 90% of the thickness of the device.

6. The device according to claim 1, wherein, together, the damping layer and the stiffening layer form at least 95% of the thickness of the device.

7. The device according to claim 1, wherein, together, the damping layer and the stiffening layer form at least 98% of the thickness of the device.

* * * * *